(12) United States Patent
Lubanski

(10) Patent No.: US 6,745,643 B2
(45) Date of Patent: Jun. 8, 2004

(54) SIDE-MOUNTED DETACHABLE PEDAL ASSEMBLY

(76) Inventor: Steven Robert Lubanski, 1933 Jefferson Dr., Pasadena, CA (US) 91104

( * ) Notice: Subject to any disclaimer, the term of this patent is extended or adjusted under 35 U.S.C. 154(b) by 10 days.

(21) Appl. No.: 10/120,007

(22) Filed: Apr. 9, 2002

(65) Prior Publication Data

US 2003/0188602 A1 Oct. 9, 2003

(51) Int. Cl.$^7$ .................................. G05G 1/14
(52) U.S. Cl. ........................ 74/594.6; 36/131
(58) Field of Search ................ 74/594.4, 594.5, 74/594.6, 594.7; 36/131, 132, 136

(56) References Cited

U.S. PATENT DOCUMENTS

| | | |
|---|---|---|
| 537,225 A | 4/1895 | O'Brien |
| 550,409 A | 11/1895 | Hanson |
| 558,463 A | 4/1896 | Bascom |
| 558,464 A | 4/1896 | Bascom |
| 587,536 A | 8/1897 | Terver |
| 616,489 A | 12/1898 | Ramsey |
| 622,947 A | 4/1899 | Garcia |
| 631,276 A | 8/1899 | Bulova |
| 639,458 A | 12/1899 | Stauffer |
| 644,818 A | 3/1900 | Diebel |
| 644,819 A | 3/1900 | Diebel |
| 672,698 A | 4/1901 | Braddock |
| 681,214 A | 8/1901 | Glover |
| 2,603,104 A | 7/1952 | Isaac |
| 4,080,017 A | 3/1978 | Meyer |
| 4,302,987 A | 12/1981 | Takeda |
| 4,381,683 A | 5/1983 | Takeda |
| 4,411,169 A | 10/1983 | Takeda |
| 4,442,732 A | 4/1984 | Okajima |
| 4,523,492 A | 6/1985 | Shimano |
| 4,526,059 A | 7/1985 | Takeda |
| 4,538,480 A | * 9/1985 | Trindle ............... 74/594.5 |
| 4,716,784 A | 1/1988 | Schlotterer |
| 4,809,563 A | * 3/1989 | Loppnow ............ 74/594.6 |
| 4,819,504 A | * 4/1989 | Sampson ............ 74/594.4 |
| 4,907,469 A | * 3/1990 | Gobbi ................. 74/594.6 |
| 5,142,938 A | * 9/1992 | Sampson ............ 74/594.6 |
| 5,315,896 A | 5/1994 | Stringer |
| 5,440,950 A | 8/1995 | Tranvoiz |
| 5,586,472 A | 12/1996 | Lin |

* cited by examiner

Primary Examiner—David A. Bucci
Assistant Examiner—Bradley J. VanPelt
(74) Attorney, Agent, or Firm—Andrew Naglestad; Michael Hoffman; Brian Carpenter

(57) ABSTRACT

A detachable pedal assembly including an axle assembly and a binding assembly with an automatic release mechanism is disclosed. The axle assembly includes a thrust bearing and threads to engage the crank. The binding assembly includes a pedal and clasp that detachably receives and locks the thrust bearing of the axle assembly in operational engagement. When a predetermined force is applied the binding assembly automatically releases from the axle assembly to permit the cyclist to dismount or avoid injury in an accident. Furthermore, the position of the release mechanism to the side of the binding assembly permits the binding assembly to be offset from the axle axis, thereby improving increased riding efficiency, lower aerodynamic drag, and increased turning clearance.

15 Claims, 5 Drawing Sheets

SIDE-MOUNTED DETACHABLE PEDAL ASSEMBLY

BACKGROUND

The present invention relates to a detachable combination shoe-pedal assembly for use in cycling. More particularly, the invention relates to a pedal assembly that permits a cycling shoe-pedal assembly to operably engage and safely disengage the pedal crank arm of a bicycle or other pedal powered apparatus.

Many modern bicycles, including those intended for road racing, are designed to transfer and convert the linear forces applied by the cyclist into rotational motion of the crank arm and sprocket. In conventional bicycles, the forces generated by the cyclist are exerted through the pedal assembly in the vertical direction when the pedal is depressed by the rider's foot as well as lifted on the upstroke. A popular configurations for road racing is the clipless pedal system comprising a pedal with a receptacle adapted to receive a cleat mounted in the sole of a special cycling shoes. This cleat snaps into the pedal receptacle allowing the cyclist to connect a shoe directly to the pedal, and indirectly to the crank arms, with ease. The cyclist's foot then disengages the pedal system by rotating or displacing the shoe in a predefined manner or under the force of an accident, for example.

Although the clipless pedal system allows the operator's foot to quickly connect to and disconnect from the crank, the cleat and corresponding receptacle in prior art systems is located directly below the sole of the cycling shoe. The location of the cleat and receptacle below the cyclist foot detrimentally affect the performance in at least three ways: First, the prior art systems, which can be as much as an inch thick, reduce the ground clearance at the underside of the pedal, thereby reducing limiting the angle at which the bicycle may be simultaneously pedaled and turned. Second, the thickness of the cleat and receptacle system increases the riding height of the cyclist and the frame, thereby increasing aerodynamic drag and bicycle weight. Third, the force exerted by the foot of the cyclist is distributed over the relatively small area of the cleat which increases the pressure of the foot in immediate proximity to the cleat of the foot and causes discomfort to the cyclist.

U.S. Pat. No. 5,586,472 to Lin, U.S. Pat. No. 5,440,950 to Tranvoiz, and U.S. Pat. No. 5,315,896 to Stringer disclose detachable pedal assemblies in which a portion of the release mechanism is located in proximity to the crank arm. In each of these patents, the pedal is mounted either directly or indirectly into the crack through the spindle. The pedal remains rotatably affixed to the crank until a linear force co-parallel to the axis of the spindle is applied. Although these prior art pedal assemblies may be quickly attached to and removed from the crank arm, manual intervention is required without which the pedal cannot be engaged or disengaged. Moreoever, these pedal assemblies are designed to facilitate the assembly and disassembly of the pedal in connection with the storage and transportation of the bicycle. These pedal assemblies do not include means to attach a cycling shoe to the pedal and are, therefore, entirely unsuitable for road racing applications where it is necessary to both press down and lift up the pedal.

SUMMARY

The present invention overcomes the limitations of the prior art with a detachable pedal assembly in which the release mechanism is positioned adjacent to the axle that threadedly engages the bicycle pedal crank arm. Location of the release mechanism to the side of the pedal and away from the underside of the cyclist's foot allows (1) the rider to assume a lower riding position, thereby reducing the frame height and aerodynamic drag; (2) the bottom side of the pedal to be raised, thereby allowing for sharper turns of the bicycle; (3) the pedal to have a greater surface area, thereby reducing the pressure across the cyclist's foot; and (4) the rider visibility of the release mechanism during engagement, unlike prior art systems.

In one embodiment of the present invention, the detachable pedal assembly is comprised of an axle assembly, binding assembly, and connecting means. The axle assembly is comprised of an axle adapted to threadedly engage the bicycle pedal crank arm. The binding assembly is comprised of a pedal through which the cycling shoe applies force to drive the bicycle. The connecting means is comprised of a bearing and releasable coupling means, the connecting means being substantially interposed between the pedal crank arm and the binding assembly in the lateral direction. Although the bearing and releasable coupling means may be affixed to either the axle assembly or the binding assembly, it is important that the releasable coupling means rigidly hold the binding assembly to the axle assembly until a force equal to or greater than a predetermined force threshold is applied, at which point the release coupling means responds by automatically disengaging the binding assembly from the axle assembly. In this manner, a cyclist may exert force on the pedal assembly without disengaging the pedal crank arm unless the cyclist chooses to disengage the binding assembly from the axle assembly. In some embodiments, the shoe-pedal assembly may be automatically disengaged from the bicycle crank if the cyclist befalls adverse circumstances.

In some embodiments of the present invention are designed with offset between the pedal of the binding assembly and the axle assembly to position the ball of the cyclist's foot at the axis of the axle. Still other embodiments adapted primarily to bicycle road racing applications include shoe fastening means permitting the cycling shoe to be affixed to the pedal assembly, thereby allowing the cyclist to drive the bicycle by pushing against the pedal in the down stroke as well as pulling on the pedal during the upstroke. The shoe fastening means may be used in combination with a force-responsive locking means that determines the force necessary to release the binding assembly from the axle assembly.

The shoe-pedal assembly in preferred embodiments is made to engage and disengage the axle mounted on the bicycle pedal crank assembly in the vertical direction, while other embodiments permit the binding assembly to engage and disengage the axle in the other directions or manners. The binding assembly may be made to alternatively engage or disengage the axle by means of one or more forces including rotational forces or linear forces applied in the horizontal or vertical plain.

DETAILED DESCRIPTION

The present invention pertains to a detachable pedal assembly permitting a cycling shoe to operably engage and safely and efficiently disengage the pedal crank arm of a bicycle or other pedal powered apparatus. The pedal assembly effectively transmits the forces exerted by the cyclist's shoe to the pedal crank arm, allowing the cyclist to both push down on the pedal as well as lift up on it so long as the forces are within a predetermined range. For safety purposes, the cyclist's shoe-pedal assembly may be released from the pedal crank when the forces reach an unsafe level as in an accident or collision, for example.

The accompanying figures depict embodiments of the detachable pedal assembly of the present invention, and features and components thereof. With regard to means for fastening, mounting, attaching or connecting the components of the present invention to form the apparatus as a whole, unless specifically described otherwise, such means are intended to encompass conventional fasteners such as machine screws, machine threads, snap rings, hose clamps such as screw clamps and the like, rivets, nuts and bolts, toggles, pins and the like. Components may also be connected by friction fitting, or by welding or deformation, if appropriate. Unless specifically otherwise disclosed or taught, materials for making components of the present invention are selected from appropriate materials such as metal, metallic alloys, natural or synthetic fibers, plastics and the like, and appropriate manufacturing or production methods including casting, extruding, molding and machining may be used.

Any references to front and back, right and left, top and bottom, upper and lower, and horizontal and vertical are intended for convenience of description, not to limit the present invention or its components to any one positional or spatial orientation.

Figure 1:
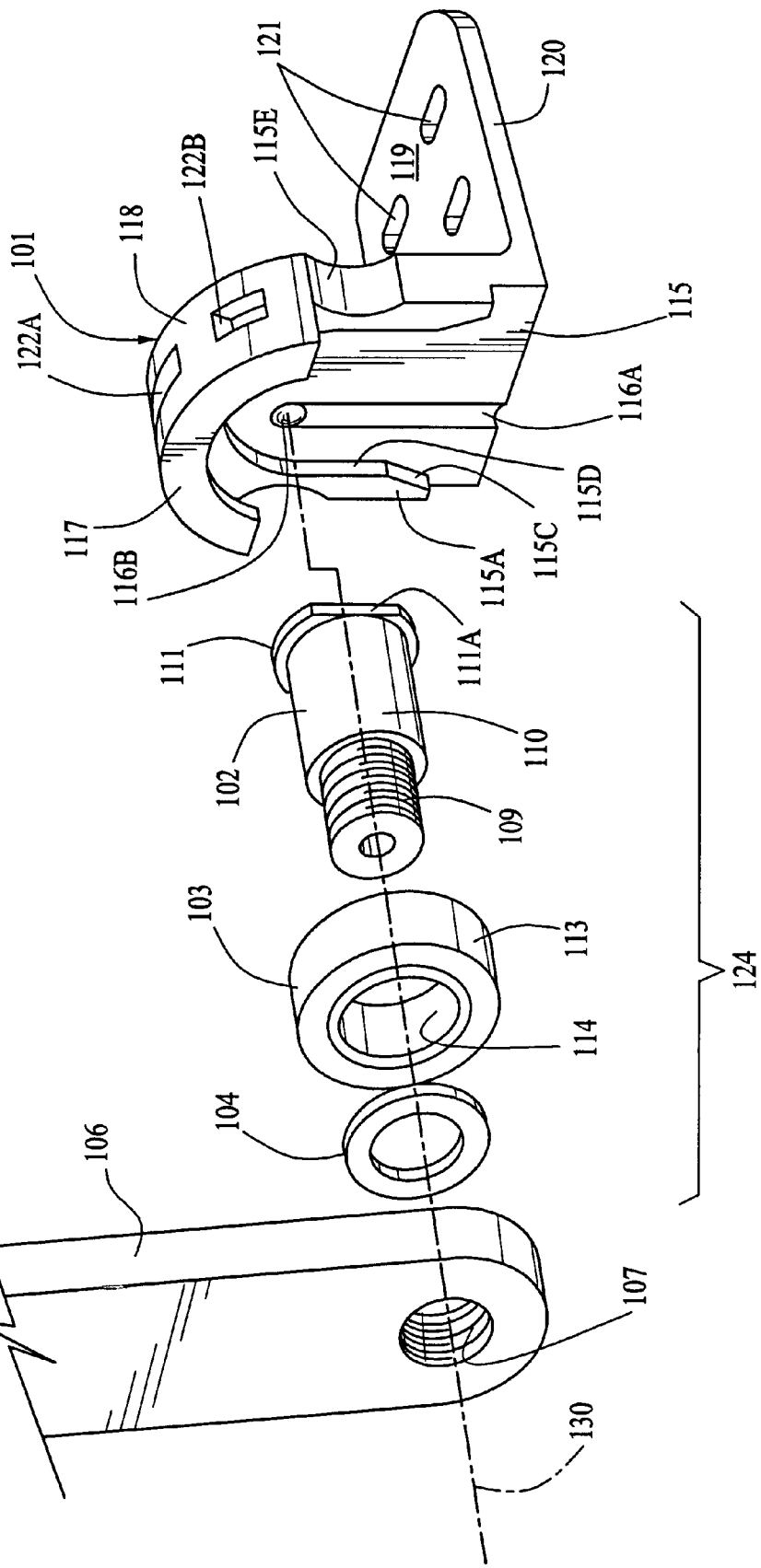
FIG. 1 is an exploded view of the detachable pedal assembly including the axle assembly, connecting means, and binding assembly of the present invention.
Figure 2:
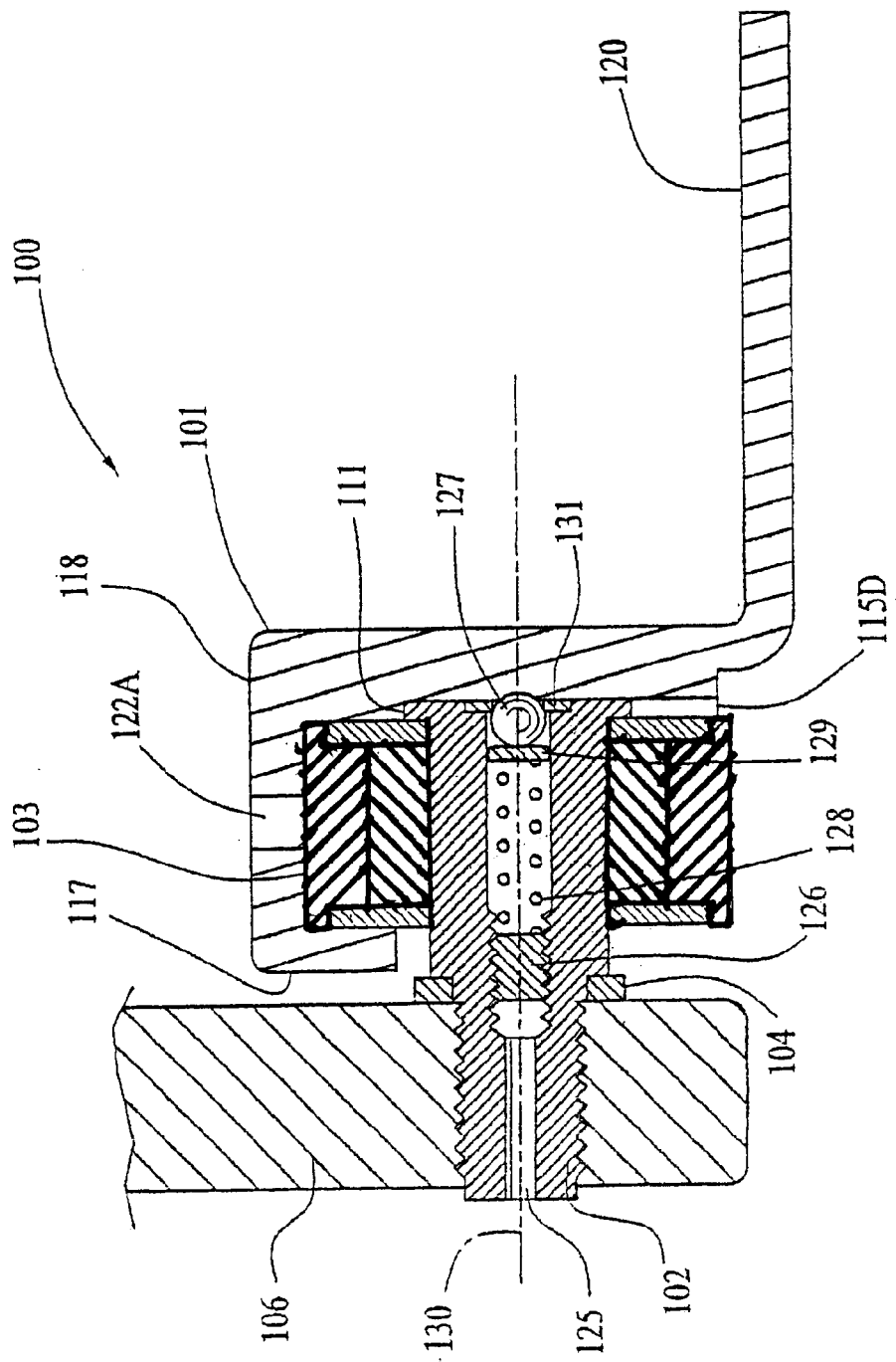
FIG. 2 is a cross-sectional view in a vertical plane through the axis of the axle in the preferred embodiment of the detachable pedal assembly.

Referring to FIGS. 1 and 2, an exploded view and cross section of the detachable pedal assembly including the axle assembly, bearing, and binding assembly of the present invention are illustrated. The axle assembly 124 in this embodiment is comprised of an axle 102, a bearing 103, and an optional spacer 104.

The axle 102 is comprised of a pedal crank connecting portion 109 and a bearing connecting portion 110. The crank connecting portion 109 preferably includes a standard thread pattern adapted to securely engage the corresponding threads 107 of the crank arm 106. The bearing connecting portion 110 is characterized by a diameter substantially equal to the diameter of the inner surface 114 of the bearing 103 such that the axle 102 and bearing 103 are securely affixed to one another after installation of the bearing 103 and during operation of the bicycle. After installation, the bearing 103 preferably abuts a retainer 111 which, in this embodiment, is a circularly symmetric lip used to prevent the bearing 103 from disengaging the axle 102 in the direction away from the crank arm 106. The retainer 111 preferably includes two parallel planar faces 111A that adapted to receive a wrench used to apply the torque necessary to engage and disengage the threads of the crank connecting portion 109 to the crank arm 106. In other embodiments, the bearing connecting portion 110 and bearing 103 may include threads, set screws, permanent welds, bonding agents, or friction fitting to prevent the unintended separation of the bearing 103 from the axle 102.

The bearing 103 represents any one of a number of alternative structures for providing a substantially friction free rotation of the binding assembly 101 relative to the axle 102. In general, the bearing 103 includes an inner surface 114 and outer surface 113 that rotate relative to one another about the bearing axis that coincides in this embodiment with the axis of the axle 130. The internal construction of bearings is well document and unnecessary for an understanding of the design, assembly and operation of the present invention.

In the preferred embodiment, the bearing 103 is a sealed thrust bearing capable of withstanding rotational forces about the axle axis 130 as well as torsional forces exerted by the binding assembly 101 discussed in more detail below. Although aircraft quality bearings are suitable, the bearing used in the present invention is subjected to relatively low speeds, typically on the order of 120 rpm in this embodiment. One skilled in the art will recognize that other standard bearings and custom bearings including various ball bearings, bearing faces, and lubricants may be equally suitable with appropriate modification to the axle 102 and binding assembly 101.

The detachable pedal assembly of the present invention may further include a spacer 104 in conjunction with the axle 102 in order to tailor the height of the axle 102 away from the pedal crank arm 106. The thickness of the spacer 104 will, in general, depend on the particular preferences of the rider.

Also illustrated in FIG. 1 is the binding assembly 101 comprised of a releasable coupling means and a pedal. In the preferred embodiment, the releasable coupling means is a clasp or receptacle in the shape of an arcuate cup comprised of the first structure 115, second structure 117, and third structure 118. The first, second, and third structures are designed with the precision and tolerance necessary to receive the bearing 103 and limit the relative movement of the binding assembly 101 and bearing 103 in non-vertical directions. In particular, the width between the first structure 115 and the second structure 117 must be substantially equal to the depth of the outer surface 113 of the bearing 103 in order avoid a loose fit that may reduce the ability of the binding assembly 101 to remain operatively engaged to the bearing 103 when upward force is applied to the binding assembly 101.

The clasp should also be constructed of a substantially rigid material such as steel, titanium, aluminum, chromoly, or carbon fiber, for example, sufficient to withstand the static and dynamic forces exerted by a cyclist under stringent riding conditions. The clasp may further include portals 122A, 122B for allowing the egress of dirt from the interior side of the clasp and to permit visual alignment of the binding assembly 101 with the axle assembly 124.

The binding assembly 101 further includes a pedal 120 for engaging the cycling shoe 140 and transferring the forces exerted by the cyclist to the axle 102. In the preferred embodiment, the pedal 120 is comprised of a substantially flat plate rigidly affixed to the releasable coupling means, although the plate may assume alternative shapes necessary for adaptation to various cycling shoes. In some embodiments, the pedal 120 further includes shoe fastening means 121 for securing the cycling shoe 140 to the binding assembly 101, as discussed below in more detail.

In some embodiments, the shoe fastening means may include a receptacle adapted to receive alternate forms of detachable pedal systems including the numerous clipless pedals on the market today.

The thickness of the pedal 120 will depend on the material selected but, in general, should be a thin as reasonably possible in order to increase the ground clearance with the bottom of the pedal 120, important during high speed angled turning or maneuvering. The pedal 120 should be constructed of a substantially rigid material such as steel, titanium, aluminum, chromoly, or carbon fiber, for example, sufficient to withstand the static and dynamic forces exerted by a cyclist under stringent riding conditions.

An important feature of some embodiments of the present invention is the force-responsive locking means that firmly retains the binding assembly 101 engaged with the axle 102 until a predetermined force is exceeded. Once the predetermined force is exceeded, for example, where the cyclist dismounts the bicycle or is in an accident, the binding assembly 101 detaches or otherwise breaks-away from the axle 102. The locking means is preferably designed to allow detachment the binding assembly 101 in a non-destructive manner, thus allowing the binding assembly 101 to later re-engage the axle 102.

Still referring to FIGS. 1 and 2, the force-responsive locking means in the preferred embodiment is comprised of a detent device with a spring-loaded ball bearing 127 in the axle 102 that engages a corresponding recess 116B in the binding assembly 101. The ball bearing 127 is held in position by the retaining washer 131 on one side and the set screw 126, spring 128, and plate 129 on the other.

To engage the binding assembly 101 and axle assembly 124 in this embodiment, the cyclist lowers the binding assembly 101 on to the axle assembly 124 with the clasp vertically aligned with the bearing 103. As the binding assembly 101 is lowered onto the axle 102, the ball bearing 127 is guided by the race 116A until the clasp fully engages the bearing 103, at which point the ball bearing 127 seats into the recess 116B. After being seated into the recess 116B, the ball bearing 127, under the force of the spring 128, prevents the binding assembly 101 from being lifted off of the axle 102 during normal operating conditions. The force exerted by the spring may be adjusted as desired up to several hundred pounds using the set screw 126 that threadedly engages the axle within the recess 125.

In this preferred embodiment, the binding assembly 101 is permitted to disengage the axle by means of a linear force applied in the vertical direction, the direction normal to the pedal surface 119. One skilled in the art will recognize that alternative embodiments of the present invention may be adapted to permit detachment of a binding assembly if a linear or rotational force is applied in one or more different directions. The present invention would be equally applicable to an apparatus in which the cyclist disengaged his foot by applying a twisting force about the pedal or a linear force outward in the direction of the axle axis, for example.

Figure 3:
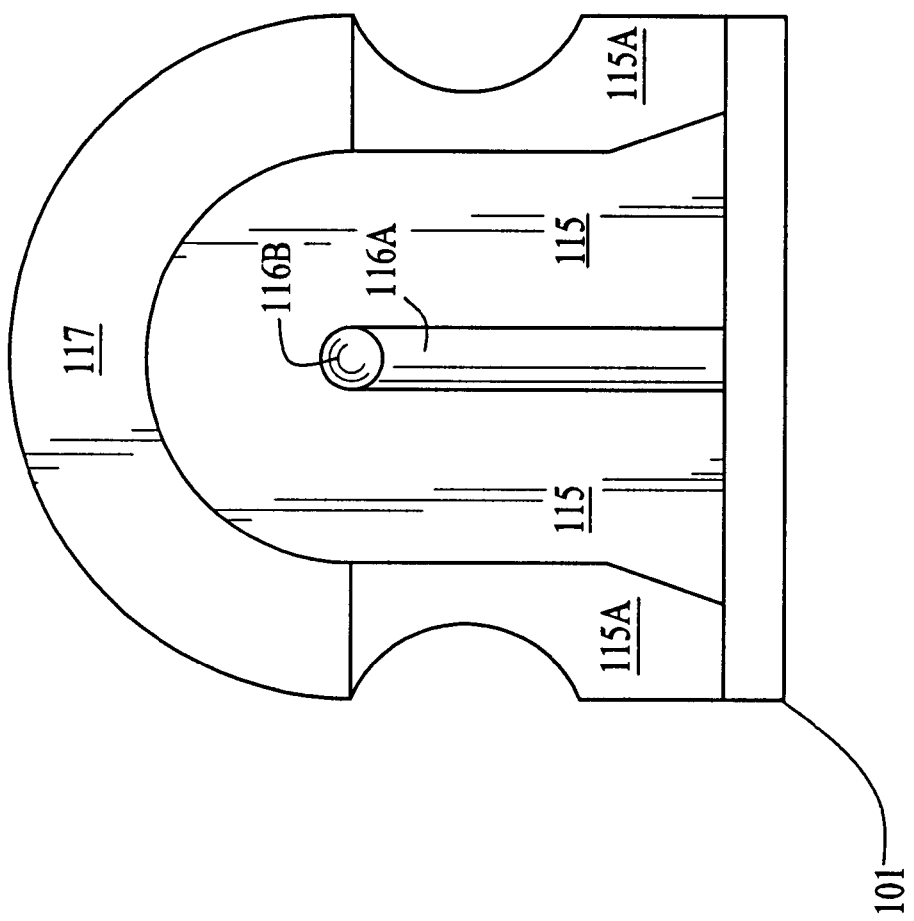
FIG. 3 is an interior side view of the binding assembly of the preferred embodiment attached to the shoe.

Referring to FIG. 3, an interior side view of the binding assembly of the preferred embodiment is illustrated. The shape of the arcuate cup of the releasable coupling means is clearly visible, including the radial contour of the second structure 117 and third structure 118. Located at the center of these concentric surfaces is the recess 116B corresponding to the ball bearing 127 located on the axis 130 of the axle 102. Leading to the recess 116B is the race 116A which approximately defines the direction that the binding assembly 101 is directed to engage and lock the axle assembly 124.

Also illustrated in the preferred embodiment is the guide 115A which assists the axle 102 into the arcuate cup. The guide 115A is elevated above the surface 115 by a distance represented by the depth of the surface 115B, which is substantially equal to the thickness of the retainer 111.

Figure 4:
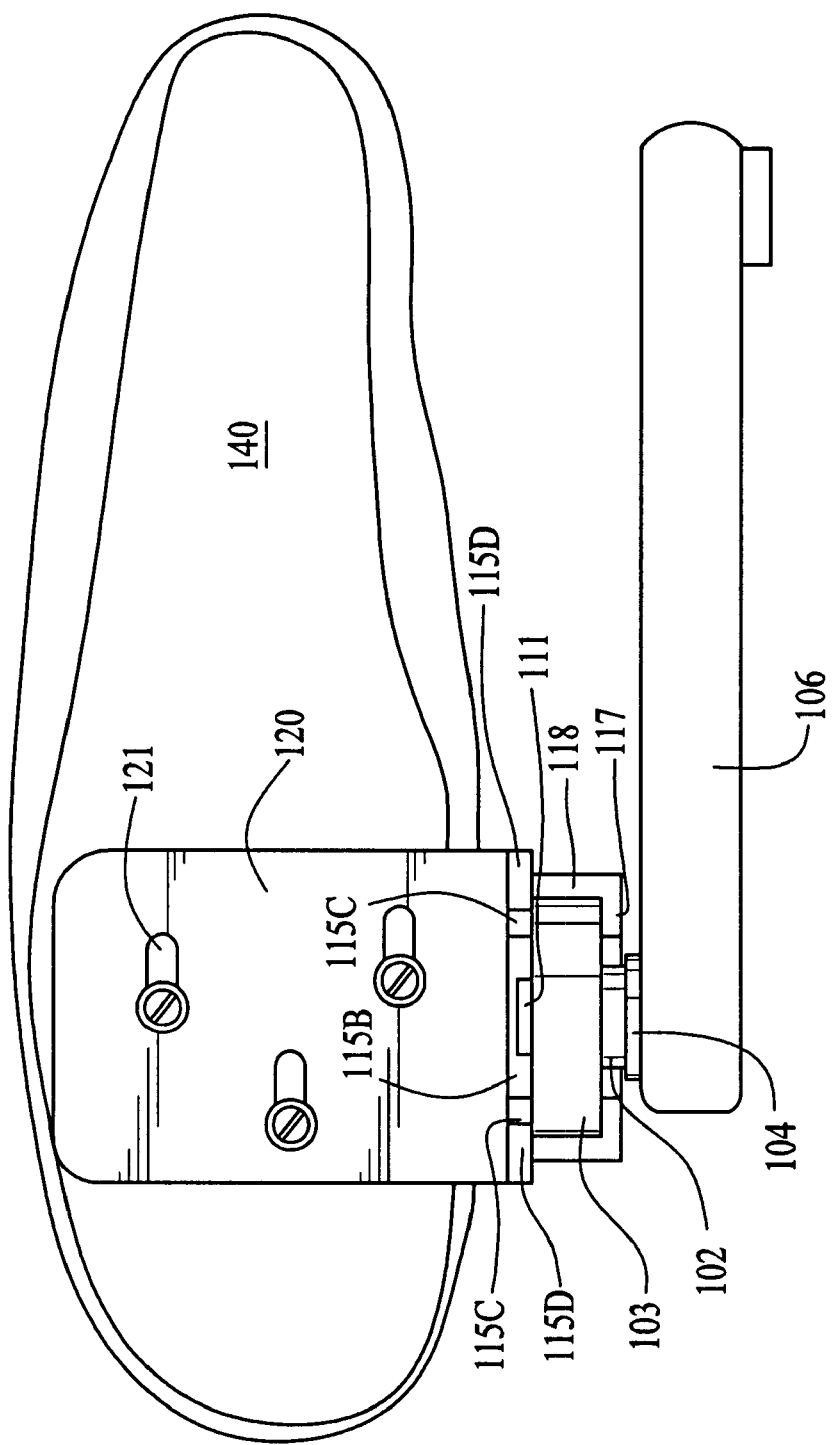
FIG. 4 is a view of the underside of the binding assembly and axle assembly, attached to the shoe and mounted into the crank arm, of the preferred embodiment.

Referring to FIG. 4, a view of the underside of the binding assembly and axle assembly when mounted into the pedal crank arm according to the preferred embodiment is illustrated. In the preferred embodiment, the pedal 120 has a width and length roughly corresponding to the ball of the cyclist's foot through which the energy is transferred during riding.

In some embodiments, the pedal 120 includes shoe fastening means for securing the cycling shoe to the binding assembly 101. The shoe fastening means may comprise holes or slots 121 sized and positioned to receive screws or bolts capable of rigidly securing a cycling shoe to the binding assembly during cycling. Of course, the screws, bolts or equivalent means may be detached, thereby allowing the shoe or binding assembly to be replaced. The pedal 120 may further comprise float means permitting the cycling shoe to "float," i.e., move in an angular and lateral direction relative to the pedal 120 to increase comfort and efficiency for the rider. The float means may be achieved in some embodiments a hinge, bearing, pivot, articulated joint, or equivalent means.

One skilled in the art will recognize the pedal 120 of the present invention also allows the cyclist to walk with the binding assembly 101 attached to the cycling shoe with minimal discomfort or damage to the binding assembly 101. Unlike the prior art pedal assemblies, the cleat is not located underneath the rider's shoe where it would otherwise be subjected to the wear and tear that occurs when the rider walks on the cleats when dismounted from the bicycle. In some embodiments, the underside of the pedal 120 may further include a durable sole made or rubber or equivalent material for reducing wear of the pedal 120 and protectively concealing the screws or bolts that engage the cycling shoe.

Figure 5:
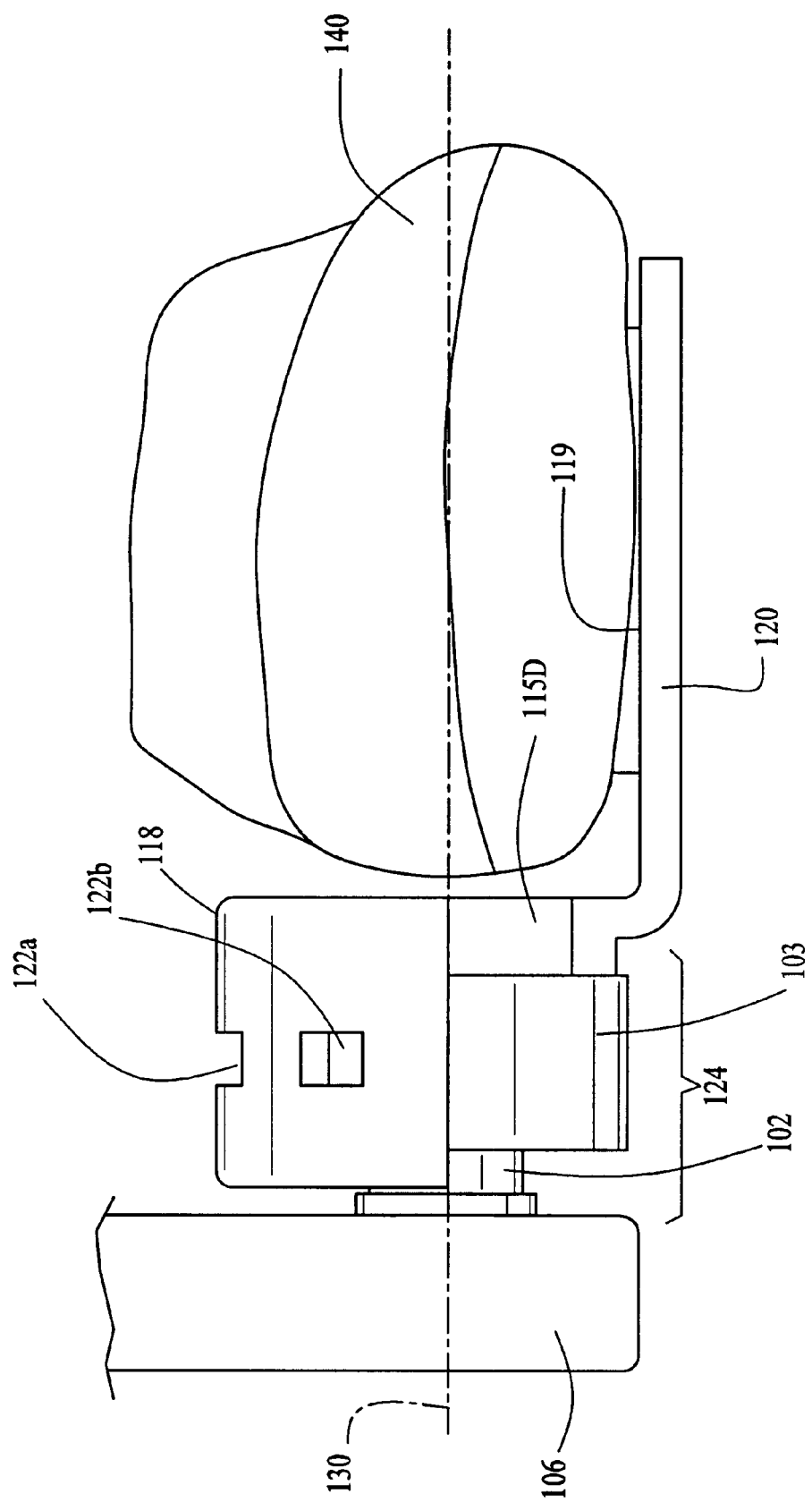
FIG. 5 is a front side view of the shoe with binding assembly, axle, and crank arm of the preferred embodiment in the locked position.

FIG. 5 is a front side view of binding assembly, axle, and crank arm of the preferred embodiment in the locked position. As shown, the clasp receives a portion of the axle assembly 124, in the preferred embodiment, thereby engaging the axle assembly 124 in a manner than supports the transfer of force from. the cyclist's foot to the crank arm 106.

One skilled in the art will recognize that the advantage of interposing the detachable interface formed by the clasp and the axle assembly 124 between the rider's foot and the crank arm 106, the height of the pedal surface 119 relative to the axle axis 130 may be adjusted to improve the performance, efficiency, and performance of the cyclist. In particular, the offset position of the pedal surface 119 in the preferred embodiment is such that the axle axis 130 approximately coincides with the ball of the rider's foot. This configuration may be optimized according to biokinetics in a manner that was previously unavailable in prior art detachable pedal systems because of the thickness of the cleat system that occupied space below the pedal.

Although the above description contains many specifics, these should not be construed as limiting the scope of the invention, but rather as merely providing illustrations of some of the presently preferred embodiments of this invention.

Therefore, the invention has been disclosed by way of example and not limitation, and reference should be made to the following claims to determine the scope of the present invention.

I claim:

1. A detachable pedal assembly permitting a cycling shoe to engage and disengage a pedal crank arm, the apparatus comprised of:

(a) an axle assembly having an axle adapted to rigidly engage the pedal crank arm, the axle characterized by an axle axis oriented in a substantially lateral direction;

(b) a binding assembly comprised of a pedal for engaging the cycling shoe;

(c) connecting means substantially interposed between the pedal crank arm and binding assembly in the lateral direction, comprising:

(i) a bearing permitting the binding assembly to rotate relative to the axle; and (ii) a releasable coupling means for connecting the binding assembly to the axle allowing automatic disengagement, in a substantially vertical direction, of the binding assembly from the axle when forces exceeding a predetermined force threshold are applied;

whereby a cyclist may exert force on the binding assembly without disengaging the binding assembly until such time that a cyclist chooses to disengage the axle or the cyclist befalls adverse circumstances.

2. The detachable pedal assembly of claim 1, wherein the pedal further includes shoe fastening means for rigidly affixing the cycling shoe to the binding assembly.

3. The detachable pedal assembly of claim 2, wherein the pedal of the binding assembly further includes float means for permitting angular or lateral movement of the cycling shoe relative to the pedal.

4. The detachable pedal assembly of claim 2, wherein the pedal of the binding assembly is offset up to two inches in the vertical direction from the axle axis, whereby the axle axis approximately coincides with the ball of the cyclist's foot.

5. The detachable pedal assembly of claim 4, wherein the bearing is a sealed thrust bearing.

6. The detachable pedal assembly of claim 5, wherein the bearing is rigidly affixed to the axle and the releasable coupling means is comprised of a clasp affixed to the binding assembly, the clasp adapted to securely and detachably receive the axle assembly.

7. The detachable pedal assembly of claim 6, wherein the predetermined force threshold is substantially determined by a force-responsive locking means that firmly retains the binding assembly in position with respect to the axle until a force exceeding the threshold is applied.

8. The detachable pedal assembly of claim 7, wherein force-responsive locking means is an adjustable spring-load detent capable of establishing a force threshold of up to 300 pounds.

9. A detachable pedal assembly permitting a cycling shoe to engage and disengage a crank arm, the apparatus comprising:

(a) an axle adapted to threadedly engage the pedal crank arm, the axle characterized by a central axis oriented in a substantially lateral direction;

(b) a binding assembly comprising
(i) a proximal end closest to the crank arm in the lateral direction,
(ii) a distal end opposite the proximal end, and
(iii) a pedal including shoe fastening means for securing to the sole of the cycling shoe; and (c) connecting means, substantially interposed between the axle and binding assembly in the lateral direction, for operationally coupling the axle and the proximal end of the binding assembly, comprising:

(i) a thrust bearing permitting the binding assembly to rotate relative to the central axis of the axle;

(ii) a force-responsive means for permitting the engagement and retention of the binding assembly in a position of engagement with respect to the axle under normal operational loads while permitting (1) automatic disengagement, in a substantially vertical direction, of the binding assembly from the a position of engagement when abnormal forces are applied to the binding assembly and (2) manual disengagement, in a substantially vertical direction, of the binding assembly when force is applied in a predetermined manner;

whereby a cyclist may exert force on the pedal in the vertical direction without disengaging the binding assembly until such time that the cyclist chooses to disengage the pedal crank arm or befalls adverse circumstances.

10. The detachable pedal assembly of claim 9, wherein the pedal of the binding assembly further includes float means for permitting angular or lateral movement of the cycling shoe relative to the pedal.

11. The detachable pedal assembly of claim 9, wherein the pedal of the binding assembly is offset up to two inches in the vertical direction from the axle axis, whereby the axle axis approximately coincides with the ball of the cyclist's foot.

12. The detachable pedal assembly of claim 9, wherein the binding assembly attaches to and detaches from the axle assembly in a substantially vertical direction.

13. The detachable pedal assembly of claim 9, wherein the thrust bearing is rigidly affixed to the axle and the coupling means is comprised of a clasp affixed to the binding assembly, the clasp adapted to securely and detachably receive the axle assembly.

14. The detachable pedal assembly of claim 9, wherein the force-responsive locking means is an adjustable spring-loaded detent capable of establishing a force threshold of up to 300 pounds.

15. A detachable pedal assembly permitting a cycling shoe to engage and disengage a pedal crank arm, the apparatus comprised of:

(a) an axle assembly comprised of an axle adapted to rigidly engage the pedal crank arm, the axle characterized by an axle axis oriented in a substantially lateral direction;

(b) a binding assembly comprised of a pedal for engaging the cycling shoe;

(c) connecting means substantially interposed between the pedal crank arm and binding assembly in the lateral direction, comprising:

(i) a bearing permitting the binding assembly to rotate relative to the axle; and (ii) a releasable coupling means for retaining the binding assembly to the axle and automatically disengaging, in a substantially vertical direction, the binding assembly from the axle when forces exceeding a predetermined force threshold are applied;

whereby a cyclist may exert force on the binding assembly without disengaging the binding assembly until such time that a cyclist chooses to disengage the axle or the cyclist befalls adverse circumstances.

* * * * *